Aug. 29, 1939. F. G. SMALL Re. 21,191

ROAD CONSTRUCTION

Original Filed July 28, 1931 3 Sheets-Sheet 1

INVENTOR
FRANCIS GORDON SMALL
BY Thos. E. Robertson
ATTORNEY

ROAD CONSTRUCTION

Original Filed July 28, 1931 3 Sheets-Sheet 2

INVENTOR.
FRANCIS GORDON SMALL
BY Thos E. Robertson
ATTORNEY.

Aug. 29, 1939. F. G. SMALL Re. 21,191

ROAD CONSTRUCTION

Original Filed July 28, 1931 3 Sheets-Sheet 3

INVENTOR.
FRANCIS GORDON SMALL
BY. Thos. E. Robertson
ATTORNEY.

Reissued Aug. 29, 1939 Re. 21,191

UNITED STATES PATENT OFFICE 21,191

ROAD CONSTRUCTION

Francis Gordon Small, Middlesex, England, assignor to Iron Paving Limited, London, England, a corporation of Great Britain Original No. 2,018,581, dated October 22, 1935, Serial No. 553,671, July 28, 1931. Application for reissue October 18, 1937, Serial No. 169,660. In Great Britain September 26, 1930

18 Claims. (Cl. 94—11)

This invention relates to improvements in and means for the construction of road surfaces.

A road surface constructed according to the present invention consists of triangular metallic tripedal blocks laid on a suitable foundation and having the interstices between the blocks themselves and between their undersides and said foundation filled with asphalt or some other suitable plastic medium. The blocks are laid on a concrete or like foundation which is covered with a plastic protective layer that serves to retain the blocks in position, slightly apart from each other while permitting expansion and contraction of the blocks under variations of weather conditions, the spaces between said blocks being subsequently filled with plastic material.

The blocks may be solid or hollow with perpendicular or inclined sides and may be internally reinforced by ribs or webs when hollow. Moreover, the blocks may be flat or curved to suit the camber or shape of the foundation or they may be shaped so as to present a cambered surface when laid on a flat foundation. Furthermore, the blocks may in some cases be provided with transparent or translucent insets—as for example glass—adapted to be illuminated from below for traffic control purposes.

Preferred embodiments of the invention are described with reference to the accompanying drawings in which:—

Figure 11:
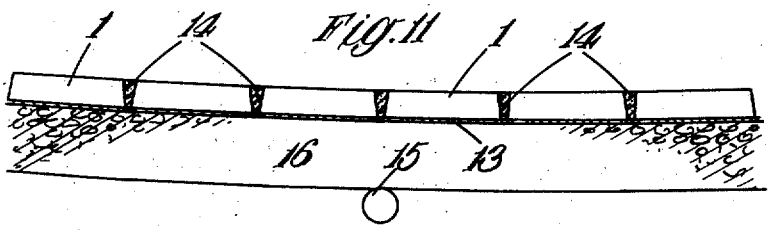
Figure 12:
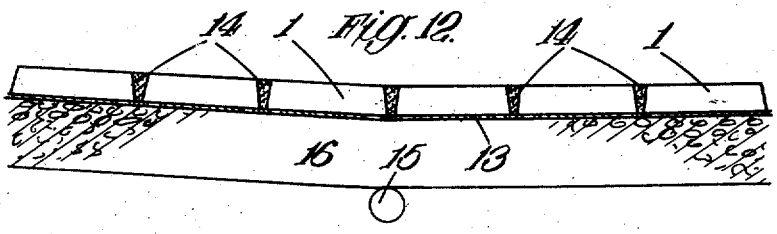
Figure 13:
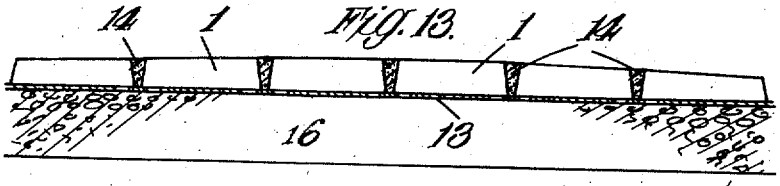

Figures 11, 12, and 13 illustrate modified types of road.

Figure 1:
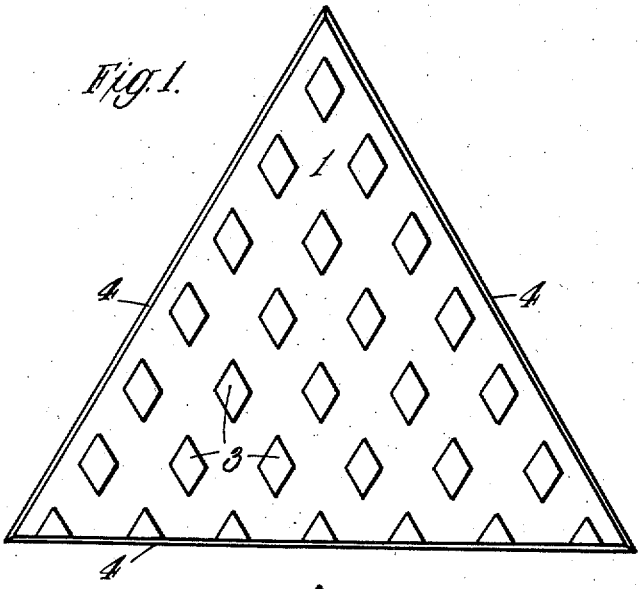
Figure 1 is a plan view of a block formed of cast iron.
Figure 2:
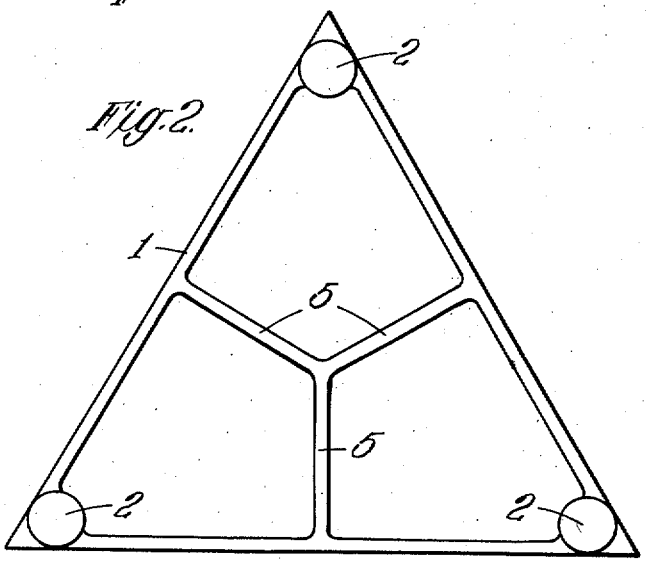
Figure 2 is an underside view of the block shown in Figure 1.
Figure 3:
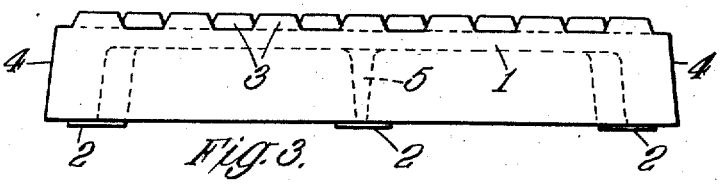
Figure 3 is a side elevation of Figure 1.

Referring now to Figures 1, 2 and 3 the block 1 composed of cast iron or other suitable metal is triangular in shape and provided with three short feet 2 located one at each corner and with a series of studs or projections 3 cast integral with the block to prevent slipping. The blocks may be solid but are preferably formed hollow as shown. The sides 4 may be vertical but are preferably inclined towards the top as shown.

The blocks when provided with inclined sides are each in the form of a frustum of a triangular pyramid. This construction serves to still further steady the block when in use by resisting any tendency to rock under the influence of lateral forces transmitted to it by the load passing over.

When the blocks may be hollow they are reinforced by ribs 5 disposed as shown in Figure 2 or arranged to proceed from each corner to the centre of the triangle, or to extend from center to center of each side so as to form a triangular web. In all cases the web is integral with the block and may finish flush with the side walls of the block, but in any case they must be clear of the foundation.

Figure 4:
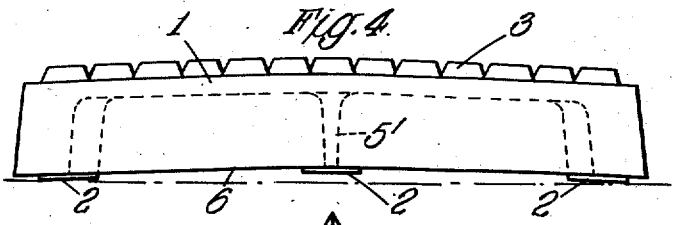
Figure 4 is a side elevation similar to Figure 3 but showing the block curved or cambered.

Referring to Figure 4 the block is as above described except that it is curved, cambered or otherwise shaped to suit the curve, camber or shape of the foundation or supporting surface. This is indicated by the curved base line 6 of the block.

Figure 5:
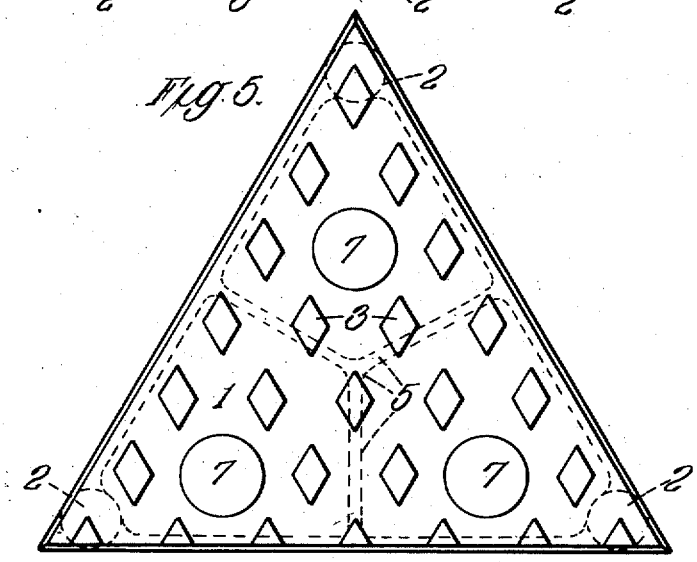
Figure 5 is a plan view of a block containing transparent or translucent insets.

Referring to Figure 5, an inset or several insets 7 formed of strong glass or other suitable material are formed in each block and adapted to be illuminated under control to serve as road direction signals. The insets may be colored according to any predetermined traffic control system.

Figure 6:
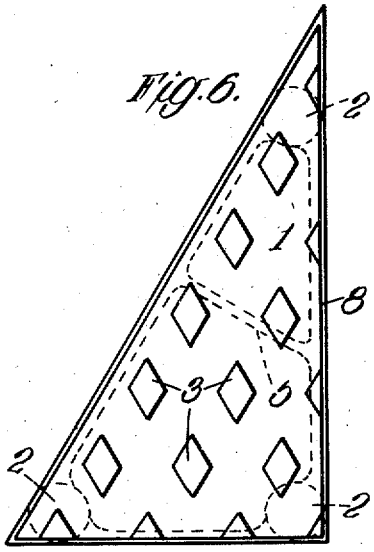
Figure 6 is a plan of a half block for filling or finishing purposes.
Figure 7:
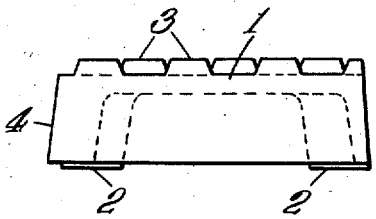
Figure 7 is an end view of Figure 6.

Figures 6 and 7 illustrate filling or half blocks to make up the sides of the roadway. They are formed substantially as above described and may not only be curved or cambered in cross-section, but may also be curved or otherwise shaped along the edge 8.

Figure 8:
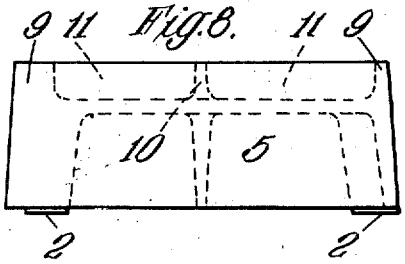
Figure 8 is an end elevation illustrating a modified form of road surface.

In the modified block shown in Figure 8, the top of the hollow block instead of being provided with studs or projections may be made somewhat deeper if necessary and provided with wells formed by the upstanding sides 9 and ribs or webs 10. The wells thus formed are filled with asphalt, wood or other suitable road surface material 11.

Road surfaces constructed from blocks such as described are illustrated in Figures 9 to 13 and will now be referred to.

Figure 9:
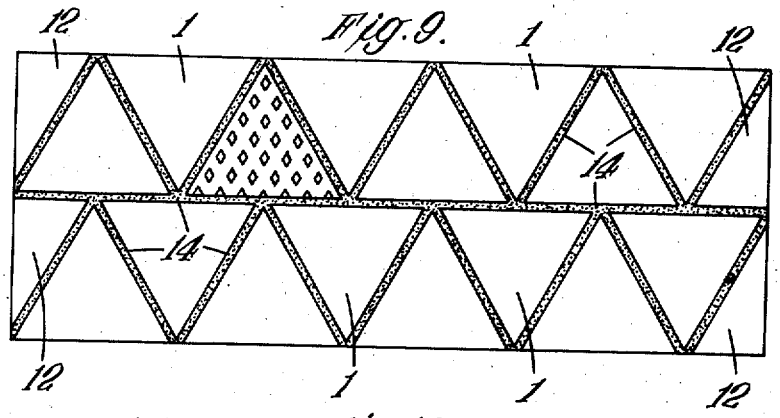
Figure 9 illustrates in plan a portion of a road surface.

Figure 9 shows an arrangement of the blocks 1 and the filling or half blocks represented at 12 to complete the surface adjacent the side walks.

Figure 10:
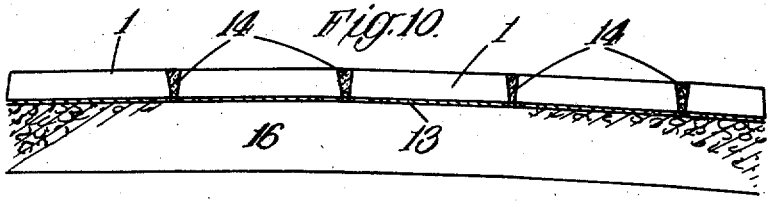
Figure 10 is a cross section through a road of the type shown in Figure 9.

The blocks are to be laid on a foundation of reinforced concrete 16 or like rigid material, see Figure 10, having a plastic layer 13 of asphalt or the like on its surface so that their feet 2 pass through the said layer into contact with the concrete. In this position the sides 4 do not touch the foundation but enter the layer of plastic asphalt or the like 13. The blocks are laid in juxtaposition with a small gap between them. When the surface or a section of same has been laid, fluid asphalt or other plastic material is poured into the interstices to bind the whole surface.

This filling between the blocks is indicated at 14 in Figures 9 to 13. The arrangement is such that the plastic layer 13 and filling 14 serve generally to retain the blocks in position and to protect the foundation. Further the plastic layer and filling permit of expansion and contraction of the blocks under variations in temperature to prevent buckling of the surface.

As shown in Figure 11 the curve or camber of the foundation is inverted to form a shallow channel otherwise the construction is as above described, with this a center drain 15 may be employed instead of two side drains.

The construction shown in Figure 12 is similar to that of Figure 11 except that the foundation and surface form a shallow V-shaped channel in cross-section.

When the blocks are laid on a flat foundation in the manner above described, the bottom surfaces of the blocks are flat but the upper surfaces may be curved to form cambered road surface. To accomplish this the blocks are formed of different heights and curved as shown.

Although several embodiments of the invention have been described and illustrated, other modifications may be made without departing from the characteristic features of the invention.

Each block may be provided with a keyhole to receive a tool for raising and lowering the block.

The invention above described is applicable for similar purposes for instance, for paving floors in factories and the like.

I claim:

1. A paving block comprising a triangular hollow metal body having a wearing surface and marginal side walls depending from said surface, each of these walls sloping outwardly downwardly, and said body being provided at the apices of the triangle with feet depending below the lower edges of said walls and which are adapted to penetrate into a sealing plastic, said sloping side walls being adapted to cooperate with similar opposed walls of similar adjacent blocks to form dovetail keyways for receiving a yieldable plastic filler.

2. A paving block comprising a triangular shaped metal casting with depending outwardly sloping walls at the sides, the underside of said block being hollow and constituting an air space defined by the continuous unbroken area of the top and side walls thereof, and feet depending from the apices of said block and extending below the lower edges of said side walls and being adapted to penetrate a yielding plastic sealing mass, the adjacent opposing side walls of said block being adapted to cooperate with the similar adjacent walls of similar blocks to form dovetail keyways to receive a yieldable plastic filler.

3. A paving block for use in association with a supporting foundation, a yieldable plastic material matrix associated with said foundation and said block, said paving block comprising a triangular shaped metal body having a hollow underside and formed with depending outwardly sloping marginal walls and provided with feet at the apices of the block extending below said walls, said feet being adapted to penetrate such yielding plastic matrix to rest upon said foundation, and in the normal arranged relation on said foundation the lateral faces of said block cooperating with the similar opposed lateral faces of similar adjacent blocks to form dovetail keyways for receiving plastic material forming part of said matrix.

4. A paving comprising a substantially rigid supporting foundation, and a plurality of juxtaposed interfitted hollow triangular metal paving blocks supported by the upper face of said foundation, each said block having a tread surface, marginal side walls sloping downwardly and outwardly from said tread surface, and feet respectively depending from the apices of said block below the lowest portions of said side walls, in combination with a sealing plastic material applied to the upper face of said foundation and between the opposed adjacent marginal side walls of adjacent blocks, said feet penetrating through said plastic material and resting on said foundation.

5. A paving comprising a substantially rigid supporting foundation, and a plurality of juxtaposed interfitted hollow triangular metal paving blocks supported by the upper face of said foundation, each said block having a tread surface, marginal side walls sloping downwardly and outwardly from said tread surface, and feet respectively depending upon the apices of said block below the lowest portions of said side walls, in combination with a sealing plastic material applied to the upper face of said foundation and between the opposed adjacent marginal side walls of adjacent blocks, said feet penetrating through said plastic material and resting on said foundation, and the lower portions of said side walls for their full lengths being in sealing contact with said sealing plastic material.

6. A paving comprising a substantially rigid supporting foundation, and a plurality of juxtaposed interfitted hollow triangular cast iron paving blocks supported by the upper surface of said foundation, each said block having a tread surface, marginal side walls sloping outwardly and depending from said tread surface, and feet respectively depending from the apices of said block below the lowest portions of said side walls, in combination with a sealing plastic material applied to the upper face of said foundation and plastic filler material applied between the opposed marginal side walls of adjacent blocks and uniting with said plastic sealing material, said feet penetrating through said sealing material and resting on said foundation, the lower portions of said side walls for their full lengths being in sealing contact with said sealing plastic material, and the material of said tread surface and the side walls of each of said blocks being imperforate to define a stagnant air space therein.

7. A paving block comprising a hollow triangular metallic block having an upper tread surface and marginal side walls depending from said surface, and a tripedal support comprising a foot at each of the apices of said triangular block and depending below the lower edges of the side walls to support said block upon a foundation, said feet having their outer edges outside the area of the upper tread surface of the block.

8. A paving block for road surface construction and the like comprising a hollow triangular metallic block having an upper tread surface and tripedal support comprising three supporting feet disposed with their outer edges outside the area of the upper tread surface of the block.

9. A road surface consisting of a rigid foundation, a plurality of hollow triangular metallic tripedal blocks laid upon said foundation and each having tripedal support thereon, and means applied between the blocks and acting as a binder and to seal the hollow spaces within the blocks.

10. A road surface consisting of a rigid foundation, a plurality of hollow triangular metallic blocks, a supporting foot at each of the apices of each block resting directly upon said foundation, and a filling of plastic material applied between the adjacent margins of the blocks, said filling acting as a binder and to seal the hollow spaces within the blocks.

11. A road surface consisting of a rigid foundation, a layer of plastic material on the surface of said foundation, a plurality of hollow triangular blocks having tripedal supporting means, said tripedal supporting means penetrating said layer of plastic material and resting directly on said foundation and a filling of plastic material applied between the adjacent margins of the blocks, said filling acting as a binder and the hollow spaces within the blocks being sealed by said plastic material.

12. A road surface consisting of a rigid foundation, a plurality of hollow triangular blocks each having an upper surface, side walls depending from the upper surfaces of said blocks, a supporting foot at each of the apices of each block, said supporting feet depending below the lower edges of said side walls and resting directly on said foundation and a filling of plastic material applied between the adjacent margins of the blocks, said filling acting as a binder and to seal the hollow spaces within the blocks.

13. A paving comprising a substantially rigid supporting foundation, and a plurality of juxtaposed hollow metal paving blocks positioned over the upper surface of said foundation, each block having an upper load carrying portion, marginal side walls extending downwardly from said upper load carrying portion, and feet depending from said block below the lowest portions of said side walls for supporting said blocks upon said foundation, in combination with a sealing material between the marginal side walls of adjacent blocks, said side walls for their full lengths being in sealing contact with the sealing material, and the hollow spaces within said blocks being sealed by said sealing material.

14. A paving comprising a substantially rigid supporting foundation, and a plurality of juxtaposed hollow interfitted triangular metal paving blocks supported by the upper surface of said foundation, each block having an upper load carrying portion, marginal side walls extending downwardly from said upper load carrying portion, and feet respectively depending from the apices of said blocks below the lowest portions of said side walls, in combination with a sealing material between the marginal side walls of adjacent blocks, said sealing material acting as a binder and to seal the hollow spaces within the blocks, said feet resting on said foundation, and said side walls for their full lengths being in sealing contact with said sealing material.

15. A paving comprising a substantially rigid supporting foundation, and a plurality of juxtaposed metal paving blocks positioned over the upper surface of said foundation, each block having an upper load carrying portion, marginal side walls extending downwardly from said upper load carrying portion, feet depending from said blocks below the lowest portions of said side walls for supporting said blocks upon said foundation, in combination with a sealing material between the marginal side walls of adjacent blocks, said side walls for their full lengths being in sealing contact with the sealing material and the hollow spaces within said blocks being sealed by said sealing material, and tread projections integral with the upper surfaces of the upper load carrying portions of said blocks.

16. A paving comprising a substantially rigid supporting foundation, and a plurality of juxtaposed interfitted triangular metal paving blocks supported by the upper surface of said foundation, each block having an upper load carrying portion, marginal side walls extending downwardly from said upper load carrying portion, feet respectively depending from the apices of said blocks below the lowest portions of said side walls, in combination with a sealing material between the marginal side walls of adjacent blocks, said feet resting on said foundation, said side walls for their full lengths being in sealing contact with said sealing material, and tread projections integral with the upper surfaces of the upper load carrying portions of said blocks, the feet at the apices of said blocks having their outer edges outside the areas of the upper load carrying portions of the blocks.

17. A road surface consisting of a rigid foundation, a plurality of triangular metallic blocks each having depending marginal side walls and provided with supporting feet providing tripedal support upon said foundation, and a bituminous sealing material disposed upon the upper surface of said foundation and extending between the adjacent blocks to a level above the lower edges of said side walls and filling the spaces between said side walls, said sealing material acting as a binder to retain the blocks in position.

18. A road surface consisting of a rigid foundation, a plurality of triangular metallic blocks each having depending marginal side walls and provided with supporting feet providing tripedal support upon said foundation, and a bituminous sealing material disposed upon the upper surface of said foundation and extending between the adjacent blocks to a level above the lower edges of said side walls and filling the spaces between said side walls, said sealing material acting as a binder to retain the blocks in position and being of yielding character when set to permit of expansion and contraction of the blocks.

FRANCIS GORDON SMALL.